United States Patent
Kinoshita et al.

(10) Patent No.: US 9,258,062 B2
(45) Date of Patent: Feb. 9, 2016

(54) OPTICAL AMPLIFICATION DEVICE AND OPTICAL AMPLIFICATION METHOD

(71) Applicant: FUJITSU LIMITED, Kawasaki-shi, Kanagawa (JP)

(72) Inventors: Susumu Kinoshita, Fuchu (JP); Setsuo Yoshida, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 262 days.

(21) Appl. No.: 14/072,900

(22) Filed: Nov. 6, 2013

(65) Prior Publication Data

US 2014/0139909 A1 May 22, 2014

(30) Foreign Application Priority Data

Nov. 22, 2012 (JP) ................. 2012-255974

(51) Int. Cl.
*H04B 10/29* (2013.01)
*H04B 10/291* (2013.01)
*H04J 14/02* (2006.01)
*H04Q 11/00* (2006.01)
*H04B 10/272* (2013.01)
*H04N 7/22* (2006.01)

(52) U.S. Cl.
CPC .......... *H04B 10/2914* (2013.01); *H04B 10/272* (2013.01); *H04J 14/0235* (2013.01); *H04Q 11/0066* (2013.01); *H04N 7/22* (2013.01)

(58) Field of Classification Search
CPC .................. H04Q 11/0066; H04Q 2011/0064; H04Q 2011/005; H04J 14/0235; H04J 2203/0067; H04N 7/22
USPC .................... 398/54, 63, 64, 67, 71, 100, 102
See application file for complete search history.

(56) References Cited

U.S. PATENT DOCUMENTS

| 6,943,925 B1* | 9/2005 | Islam | G02B 6/3516 359/108 |
|---|---|---|---|
| 7,145,704 B1* | 12/2006 | Islam | G02B 26/0808 359/108 |
| 2002/0145776 A1* | 10/2002 | Chow | H04B 10/69 398/212 |
| 2008/0205888 A1* | 8/2008 | Noguchi | H03D 9/00 398/50 |
| 2008/0239472 A1* | 10/2008 | Noguchi | G02F 1/015 359/344 |
| 2009/0058534 A1* | 3/2009 | Ueno | H03F 1/565 330/302 |
| 2009/0208227 A1* | 8/2009 | Yoshida | H04B 10/27 398/202 |
| 2009/0237781 A1* | 9/2009 | Hoshi | H01S 3/005 359/344 |
| 2009/0297147 A1* | 12/2009 | Yoshida | H03K 19/00346 398/45 |
| 2010/0123945 A1* | 5/2010 | Kai | H03K 5/01 359/239 |

(Continued)

FOREIGN PATENT DOCUMENTS

JP 2009-55550 3/2009

*Primary Examiner* — Ari M Diacou
(74) *Attorney, Agent, or Firm* — Staas & Halsey LLP

(57) ABSTRACT

An optical amplification device includes: a plurality of semiconductor optical amplifiers to which an optical burst signal is input at a different timing; an optical coupler that combines output signals output from the plurality of semiconductor optical amplifiers; a detection unit that detects an optical inputting to the plurality of semiconductor optical amplifiers; and a control unit that activates one of the semiconductor optical amplifiers where the optical inputting is detected, inactivates the other semiconductor optical amplifier, and remains the activation until another optical inputting is detected in the other semiconductor optical amplifier.

5 Claims, 11 Drawing Sheets

(56) References Cited

U.S. PATENT DOCUMENTS

2011/0116803 A1* 5/2011 Sone .................. H04Q 11/0067 398/98
2011/0254608 A1* 10/2011 Kai .................... H04B 10/2942 327/306
2012/0257272 A1* 10/2012 Yoshida ............. H04B 10/2914 359/344
2012/0293228 A1* 11/2012 Kai .................... H04B 10/2942 327/306
2014/0002885 A1* 1/2014 Graham ............. H04Q 11/0005 359/276

* cited by examiner

OPTICAL AMPLIFICATION DEVICE AND OPTICAL AMPLIFICATION METHOD

CROSS-REFERENCE TO RELATED APPLICATION

This application is based upon and claims the benefit of priority of the prior Japanese Patent Application No. 2012-255974, filed on Nov. 22, 2012, the entire contents of which are incorporated herein by reference.

FIELD

A certain aspect of embodiments described herein relates to an optical amplification device and an optical amplification method.

BACKGROUND

Japanese Patent Application Publication No. 2009-55550 discloses a technology in which an SOA (Semiconductor Optical Amplifier) is used as a gate switch by activating or inactivating the SOA.

SUMMARY

According to an aspect of the present invention, there is provided an optical amplification device including: a plurality of semiconductor optical amplifiers to which an optical burst signal is input at a different timing; an optical coupler that combines output signals output from the plurality of semiconductor optical amplifiers; a detection unit that detects an optical inputting to the plurality of semiconductor optical amplifiers; and a control unit that activates one of the semiconductor optical amplifiers where the optical inputting is detected, inactivates the other semiconductor optical amplifier, and remains the activation until another optical inputting is detected in the other semiconductor optical amplifier.

According to another aspect of the present invention, there is provided an optical amplification method of an optical amplification device combining output signals output by a plurality of semiconductor optical amplifiers to which an optical burst signal is input at a different timing, the method including: activating one of semiconductor optical amplifiers where an optical inputting is detected; inactivating the other semiconductor optical amplifier; and remaining the activation until another optical inputting is detected in the other semiconductor optical amplifier.

DESCRIPTION OF EMBODIMENTS

In a PON (Passive Optical Network) repeater, an SOA may be used as an optical gate switch and an optical amplifier having a level control function, an optical signal may be amplified by activating the SOA when an optical inputting is detected (an optical intensity is equal to a threshold or more), and the optical signal may be shut down by inactivating the SOA when the optical inputting is not detected (the optical intensity is less than the threshold). In the structure, when an optical burst signal is input, a detection of inputting of an optical signal is possible because an input optical intensity is stable in a preamble of each optical burst signal. However, when a continuing of zero continues after the preamble of the optical burst signal, the SOA is inactivated. When the SOA is inactivated by the continuing of zero, a changing of an optical intensity is unstable in a signal indicating "1" after the continuing of zero. Therefore, it is difficult to detect the signal indicating "1" without fail. Therefore, it is not possible to amplify the optical burst signal without fail.

The following is a description of embodiments, with reference to the accompanying drawings.

First Embodiment

Figure 1A:
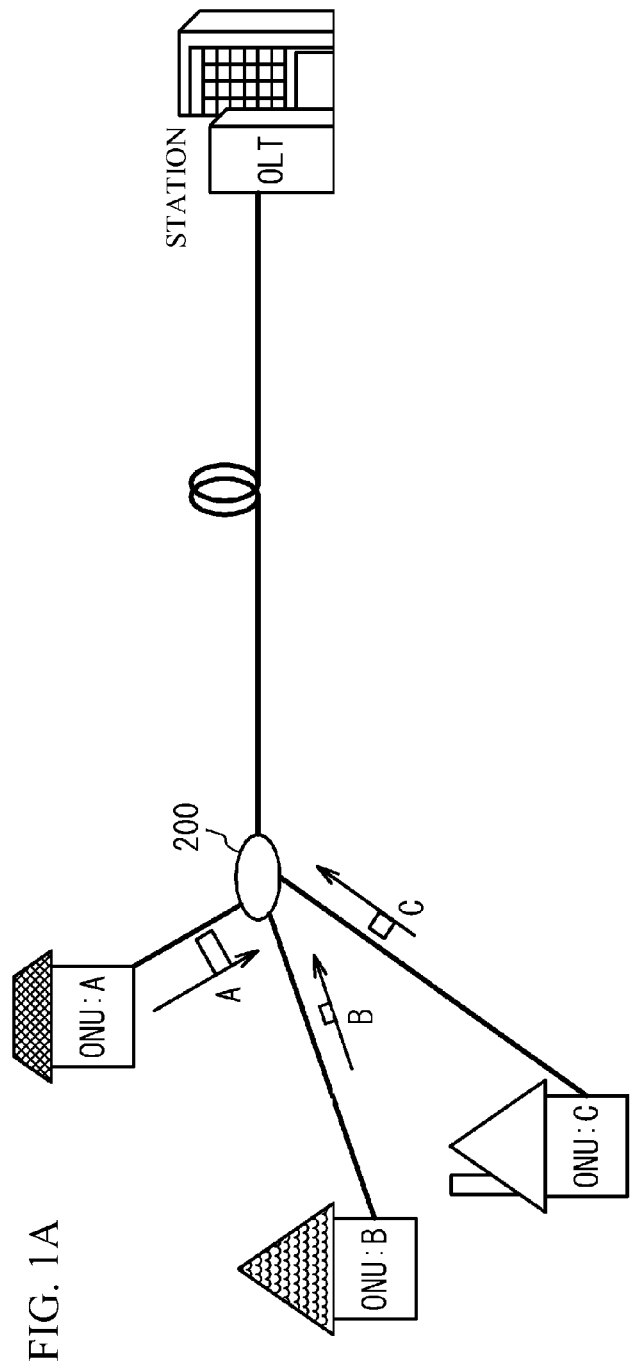
FIG. 1A illustrates a schematic view of a PON system.

FIG. 1A illustrates a schematic view of a PON (Passive Optical Network) system. As illustrated in FIG. 1A, a remote node 200 for an optical amplification is provided between an OLT (Optical Line Terminal) acting as a station and each ONU (Optical Network Unit). A downbound optical signal transmitted by the OLT is amplified by the remote node 200 and is transmitted to each ONU. An upbound optical signal transmitted by each ONU is amplified by the remote node 200 and is transmitted to the OLT.

A timing of transmitting and receiving an optical signal is controlled between the OLT and each ONU. An optical signal is transmitted from each ONU to the OLT at a different timing in the upbound direction from each ONU to the OLT. Optical signals A to C are an optical signal transmitted by ONUs that are different from each other. An optical signal transmitted intermittently and discontinuously is referred to as an optical burst signal. In the upbound direction from each ONU to the OLT, a distance from each ONU to the remote node 200 is different from each other. Therefore, an optical loss amount occurring in a path from each ONU to the remote node 200 is different from each other. And, there is variability in optical intensity of an optical burst signal arriving at the remote node 200. The remote node 200 is a device for adjusting optical intensity of each optical burst signal and transmitting each optical burst signal by a time-division multiplexing.

Figure 1B:
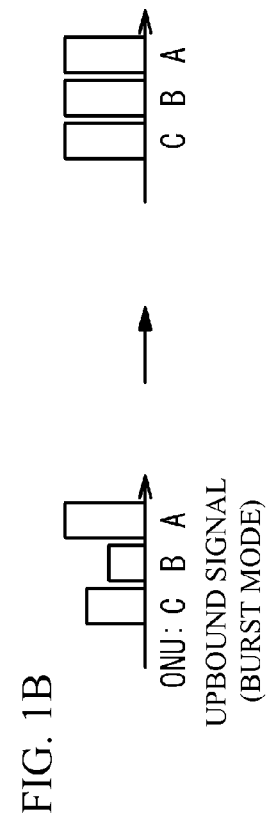
FIG. 1B illustrates an optical signal transmitted from each ONU to an OLT.

FIG. 1B illustrates adjusting of optical intensity by the remote node 200. As illustrated in FIG. 1B, there is variability in optical intensity of an optical burst signal arriving at the remote node 200. After adjusting the optical intensity by the remote node 200, the variability of optical intensity of each burst signal is suppressed.

Figure 2:
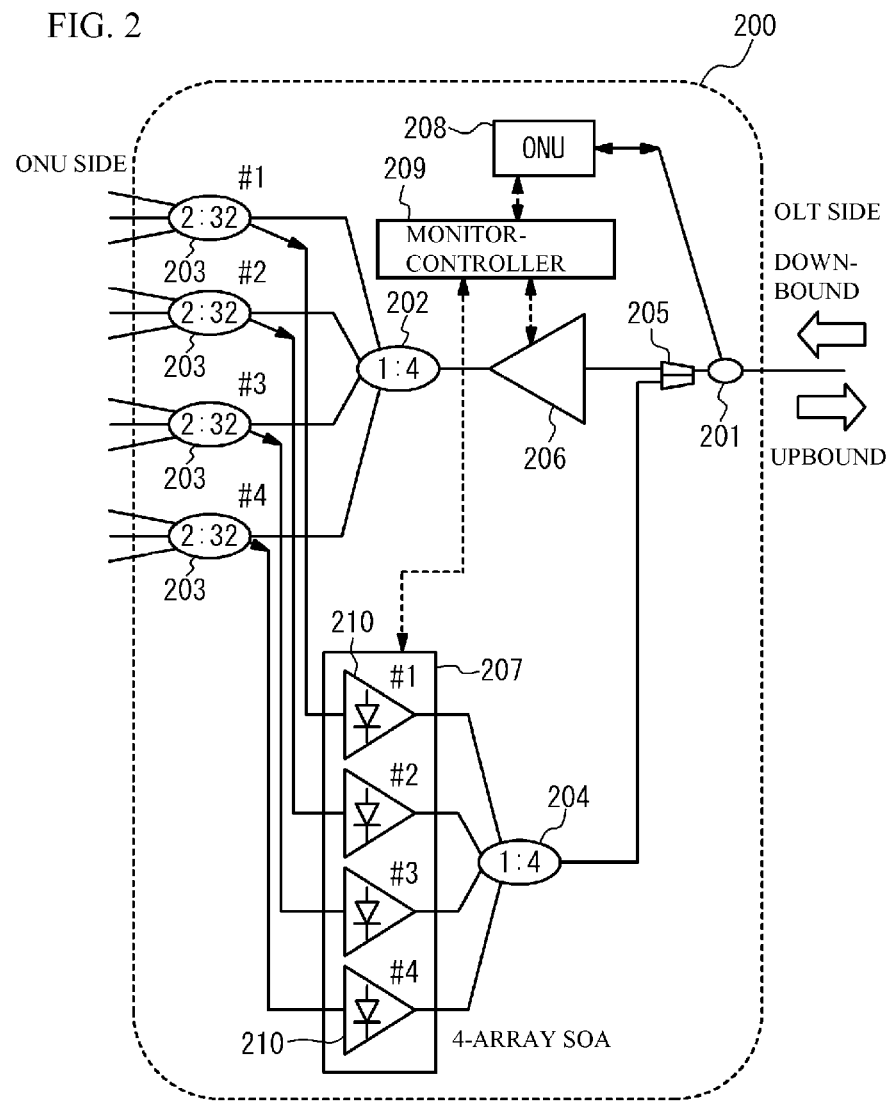
FIG. 2 illustrates a block diagram of a structure of a remote node.

FIG. 2 illustrates a block diagram for describing a structure of the remote node 200. As illustrated in FIG. 2, the remote node 200 has optical couplers 201 to 204, a multiplexer-demultiplexer 205, a fiber amplifier 206, an optical amplification module 207, an ONU 208, a monitor-controller 209 and so on. Next, a description will be given of an outline of an operation of the remote node 200.

An optical signal from the OLT in a downbound direction is input into the optical coupler 201. The optical coupler 201 inputs a part of the optical signal in the downbound direction into the ONU 208 and inputs the rest into the multiplexer-demultiplexer 205. The ONU 208 transmits information relating to the input optical signal to the monitor-controller 209. On the other hand, the ONU 208 receives and transmits information with the OLT via the optical coupler 201. The multiplexer-demultiplexer 205 inputs an optical signal input by the optical coupler 201 into the fiber amplifier 206. The fiber amplifier 206 amplifies the optical signal in accordance with an instruction from the monitor-controller 209 and inputs the amplified optical signal into the optical coupler 202.

The optical coupler 202 branches the optical signal from the fiber amplifier 206 into a plurality of optical signals. In the example of FIG. 2, the optical coupler 202 is a 1:4 coupler and thereby branches an optical signal into four optical signals. The number of the optical coupler 203 is the same as that of the branching number of the optical coupler 202. In the example of FIG. 2, four optical couplers 203 are provided according to port numbers #1 to #4. Each optical coupler 203 branches the optical signal from the optical coupler 202 into a plurality of optical signals. In the example of FIG. 2, the optical coupler 203 is a 2:32 coupler and branches the optical signal from the optical coupler 202 into 32 optical signals.

The optical burst signal from each ONU in the upbound direction is input into any of the optical couplers 203 of #1 to #4 at a different timing. The optical coupler 203 inputs the optical burst signal from the ONU into the optical amplification module 207. The optical amplification module 207 has a plurality of semiconductor optical amplifiers (SOA) 210 of which the number is the same as the number of the optical couplers 203 according to the port numbers #1 to #4. Each optical coupler 203 and each SOA 210 is optically coupled to each other by 1:1. For example, the optical coupler 203 of #1 is optically coupled to the SOA 210 of #1. The SOA 210 amplifies the optical burst signal in accordance with an instruction from the monitor-controller 209 and inputs the amplified optical burst signal into the optical coupler 204. The optical coupler 204 time-division multiplexes the optical burst signal from each SOA 210 and inputs the time-division-multiplexed optical burst signal into the multiplexer-demultiplexer 205. The multiplexer-demultiplexer 205 outputs the optical burst signal from the optical coupler 204 to the OLT via the optical coupler 201.

Each SOA 210 absorbs an input light when a drive voltage is 0V. In this case, each SOA 210 acts as a shutter. On the other hand, each SOA 210 outputs a light with a gain according to the drive voltage when the drive voltage more than 0 V is input. Therefore, each SOA 210 acts as a gate switch operating according to the drive voltage.

Figure 3:
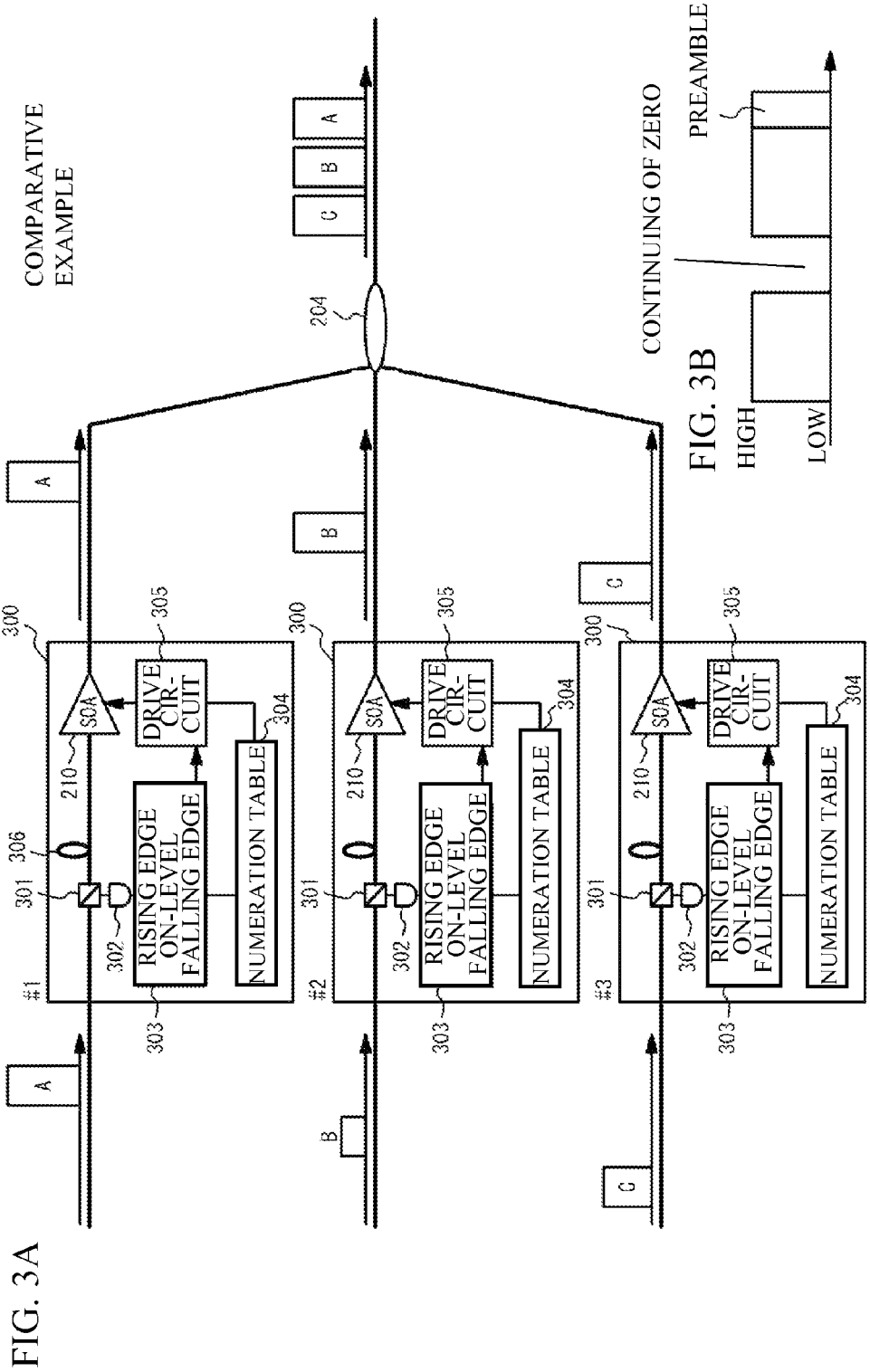
FIG. 3A illustrates a block diagram of a level control unit in accordance with a comparative example.
FIG. 3B illustrates a degradation of a signal caused by continuing of zero.

FIG. 3A illustrates a block diagram for describing a level control device in accordance with a comparative example. The level control device is a process device that controls an optical level (optical intensity) of each optical burst signal in the upbound direction and corresponds to the optical amplification module 207 and the monitor-controller 209 of FIG. 2. In FIG. 2, the optical amplification module 207 has four SOAs 210. However, in FIG. 3A, the port numbers #1 to #3 are described.

In the example of FIG. 3A, level control devices 300 of the port numbers #1 to #3 are provided. The level control device 300 has the SOA 210, an optical coupler 301, a light-receiving element 302, an individual control unit 303, a numeration table unit 304, a drive circuit 305 and a delay line 306.

Next, a description will be given of an operation of the level control device 300. The optical coupler 301 inputs a part of an input optical burst signal into the light-receiving element 302, and inputs the rest into the SOA 210. The light-receiving element 302 detects optical intensity of the input optical burst signal. When the individual control unit 303 detects a rising edge of the optical burst signal detected by the light-receiving element 302, the individual control unit 303 reads optical intensity (on-level) after the rising edge and gives the optical intensity to the numeration table unit 304. The numeration table unit 304 searches a drive voltage value for controlling the on-level value to a desirable constant optical level and gives a searched drive voltage value to the drive circuit 305. The drive circuit 305 applies a drive voltage of the received drive voltage value to the SOA 210. The delay line (optical fiber) 306 is inserted between the optical coupler 301 and the SOA 210. A delay time of the delay line 306 is the same as a time of a control delay from a time when an optical burst signal reaches the light-receiving element 302 to a time when a drive voltage is applied to the SOA 210. Thus, the SOA 210 is activated without a lack of a burst signal caused by the time of the control delay. And, an optical level of the optical burst signal input into the SOA 210 is controlled to be a desirable value. After that, the individual control unit 303 transmits an off-signal to the drive circuit 305 when the individual control unit 303 detects a falling edge of an optical signal detected by the light-receiving element 302. The drive circuit 305 controls the drive voltage to the SOA 210 to be zero when receiving the off-signal. Thus, the SOA 210 is inactivated.

In a comparative example, an optical level of an optical burst signal A input into the level control device 300 of #1, an optical level of an optical burst signal B input into the level control device 300 of #2, and an optical level of an optical burst signal C input into the level control device 300 of #3 are controlled to be a desirable value. Thus, a variability of the optical level of each optical burst signal output from the optical coupler 204 is suppressed. However, in the structure of the comparative example, when a continuing of zero continues in the optical burst signals A to C, the SOA 210 to which the optical burst signal is input is inactivated and the optical burst signal is degraded.

FIG. 3B illustrates a degradation of a signal caused by the continuing of zero. As illustrated in FIG. 3B, an optical burst signal from each ONU has a high level (1) and a low level (0). The optical burst signal from each ONU has a preamble as a head. The preamble is a scramble portion (Sync Time) in which a pattern is fixed. For example, the preamble is a signal in which "0" and "1" are arrayed alternately. When a rising edge is detected and the SOA 210 is activated in a period when the preamble is input, an optical level of a signal after the preamble is amplified to a desirable level. It is therefore possible to detect the signal after the preamble with high accuracy. However, in the optical signal from each ONU, the continuing of zero may occur when the low level continues. When the continuing of zero occurs, a falling edge is detected. Thus, the SOA 210 is inactivated. In this case, when a high level indicating "1" is input, a pattern after the high level is not a preamble but a main body of data (payload). Therefore, the pattern is not a fixed pattern. For example, another continuing of zero may occur just after a first "1" after the continuing of zero in the payload finishes. On the other hand, a response speed of the light-receiving element 302 is late so that the light-receiving element 302 cannot response to "1" and "0" that are one bit of an optical burst signal. The light-receiving element 302 reads an average optical intensity in a bit pattern in which "1" and "0" appear 50% by 50% averagely (reading of on-level). Thus, the light-receiving element 302 estimates that a level of "1" that is one bit of the optical burst signal is twice as the optical intensity of the average optical intensity. Therefore, when another continuing of zero occurs again just after a first "1" after the continuing of zero finishes, an intensity of a rising edge detected by "1" may be detected weakly in the light-receiving element 302. In an extreme case, the detected intensity does not exceed a threshold. Therefore, the rising edge is not detected. In the case, the SOA is not activated. Therefore, the "1" is not output, and data lacking may occur. In a case where a data just after a first "1" after the continuing of zero is not a continuing of zero, when a bit pattern has more "0" than "1", a rising edge detected by the light-receiving element 302 rises more moderately than a case where "0" and "1" appear 50% by 50%. Therefore, a time required for exceeding a threshold for detecting a rising edge is longer than a case of a rising edge by a preamble. Accordingly, the time of control delay is longer than a delay time by the delay line 306 inserted with a view that a rising edge is detected in a preamble. Therefore, the timing for activating the SOA is delayed. And a lacking or a degradation of an output signal may occur. Further, when a bit pattern has less "0" than "1" or a bit pattern has more "0" than "1", the bit patterns are not a bit pattern in which "1" and "0" appear 50% by 50%. In this case, even if a rising edge is detected, an optical intensity of an on-level after the rising edge cannot be detected with high accuracy. Therefore, a drive voltage that is different from a drive voltage to be applied essentially is applied to the SOA. Accordingly, the optical intensity of an output optical burst signal cannot be controlled to be constant.

Figure 4:
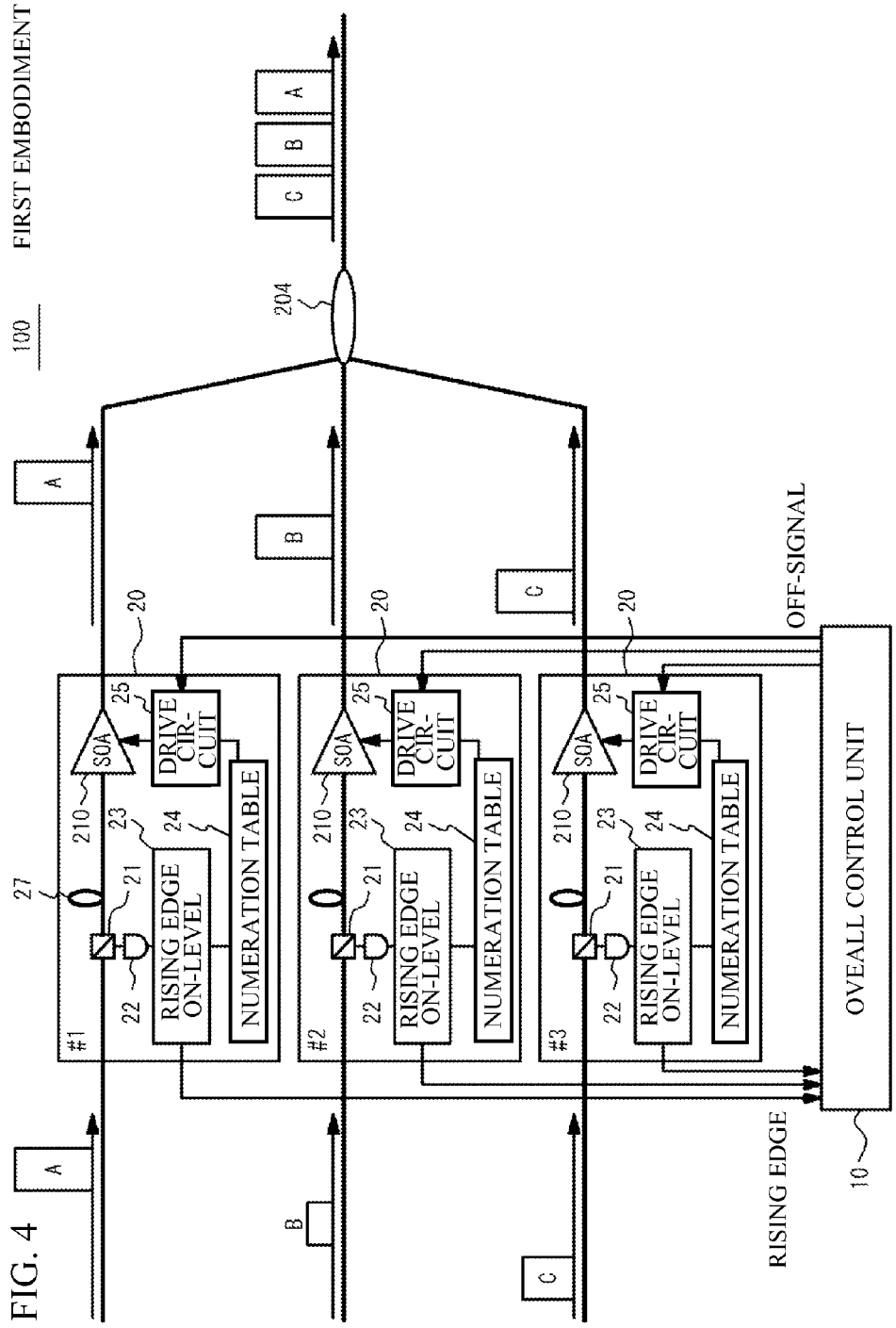
FIG. 4 illustrates a block diagram of an overall structure of an optical amplification device in accordance with a first embodiment.

And so, in the embodiment, a description will be given of an optical amplification device that is capable of improving a detection accuracy of an optical burst signal. FIG. 4 illustrates a block diagram for describing an overall structure of an optical amplification device 100 in accordance with the embodiment. The optical amplification device 100 corresponds to the optical amplification module 207 and the monitor-controller 209 of FIG. 2. In FIG. 2, four SOAs 210 are provided in the optical amplification module 207. However, the port numbers #1 to #3 are described in FIG. 4.

The optical amplification device 100 has an overall control unit 10, and the level control devices 20 of the port numbers #1 to #3. The level control device 20 has the SOA 210, an optical coupler 21, a light-receiving element 22, an individual control unit 23, a numeration table unit 24, a drive circuit 25 and a delay line 27.

Next, a description will be given of an operation of the level control device 20. The optical coupler 21 inputs a part of an input optical burst signal into the light-receiving element 22, and inputs the rest of the optical burst signal into the SOA 210. The light-receiving element 22 detects an optical intensity of the input optical burst signal. The individual control unit 23 reads an optical intensity (on-level) after a rising edge, when the individual control unit 23 detects the rising edge of the optical burst signal detected by the light-receiving element 22. The individual control unit 23 gives the optical intensity to the numeration table unit 24 and transmits a rising-edge detection signal indicating a detection of a rising edge to the overall control unit 10.

The numeration table unit 24 searches a drive voltage value for adjusting a value of an on-level to a desirable constant optical level, and gives a searched drive voltage value to the drive circuit 25. The drive circuit 25 applies a drive voltage having the drive voltage value to the SOA 210. The delay line 27 is inserted between the optical coupler 21 and the SOA 210. The delay line 27 causes a delay time that is the same as the time of control delay from a time when an optical burst signal reaches the light-receiving element 22 to a time when a drive voltage is applied to the SOA 210. Thus, the SOA 210 can be activated without a lacking of the burst signal because of the time of control delay. And, the optical level of the optical burst signal input into the SOA 210 can be controlled to be a desirable value. On the other hand, the overall control unit 10 transmits an off-signal for instructing inactivation to the drive circuit 25 of the level control device 20 other than the level control device 20 having transmitted a rising-edge detection signal, when receiving a rising-edge detection signal. The drive circuit 25 receiving the off-signal controls the drive voltage of the SOA 210 to be zero. Thus, the SOA 210 is inactivated. For example, when a rising-edge detection signal is transmitted from the level control device 20 of #1, the SOAs 210 of the level control units of #2 and #3 are inactivated. The overall control unit 10 remains the activation of the SOA 210 of the level control device 20 where the rising edge is detected until another rising edge is detected in another level control device 20.

Figure 5:
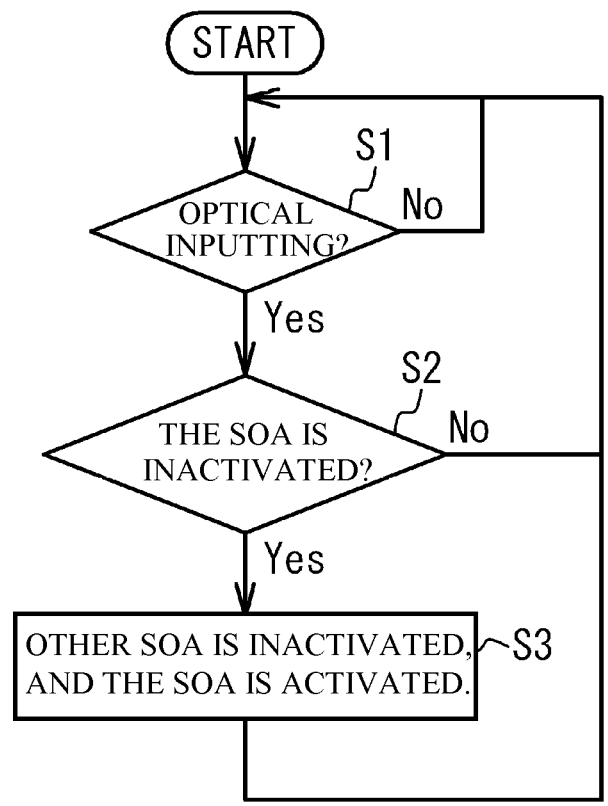
FIG. 5 illustrates a flowchart of an example of an operation of the optical amplification device.

FIG. 5 illustrates a flowchart of an example of an operation of the optical amplification device 100. As illustrated in FIG. 5, the individual control unit 23 of each level control device 20 determines whether an optical burst signal is input (Step S1). In concrete, the individual control unit 23 determines whether a rising edge is detected. When it is determined as "No" in the Step S1, the Step S1 is executed again. When it is determined as "Yes" in the Step S1, the individual control unit 23 determines whether the SOA 210 of the level control device 20 where the rising edge is detected is being inactivated (Step S2). In concrete, the individual control unit 23 determines whether the drive circuit 25 of the level control device 20 thereof sets a drive voltage to be zero.

When it is determined as "No" in the Step S2, the Step S1 is executed again. When it is determined as "Yes" in the Step S2, the individual control unit 23 gives an on-level to the numeration table unit 24 and transmits a rising-edge detection signal to the overall control unit 10. Thus, the SOA 210 is activated. On the other hand, the overall control unit 10 transmits an off-signal for instructing an off to the drive circuit 25 of the level control device 20 other than the level control device 20 having transmitted the rising-edge detection signal. The drive circuit 25 receiving the off-signal controls the drive voltage of the SOA 210 to be zero. Thus, the SOA 210 of the level control device 20 other than the level control device 20 where the rising edge is detected is inactivated (Step S3). After that, the Step S1 is executed again.

In the embodiment, a falling edge of an optical signal is not detected. Therefore, when one of the SOAs 210 is activated, the activation is remained until another rising edge is detected in another level control device 20. In this case, even if a continuing of zero continues in the optical burst signal, the activation of the SOA 210 of the port number where the rising edge is detected is remained. Therefore, the detection accuracy of the optical burst signal is improved. On the other hand, the SOA 210 of other level control device 20 is inactivated.

Therefore, a noise caused by the SOA 210 of other level control device 20 is suppressed, and a degradation of system efficiency is suppressed.

Figure 6:
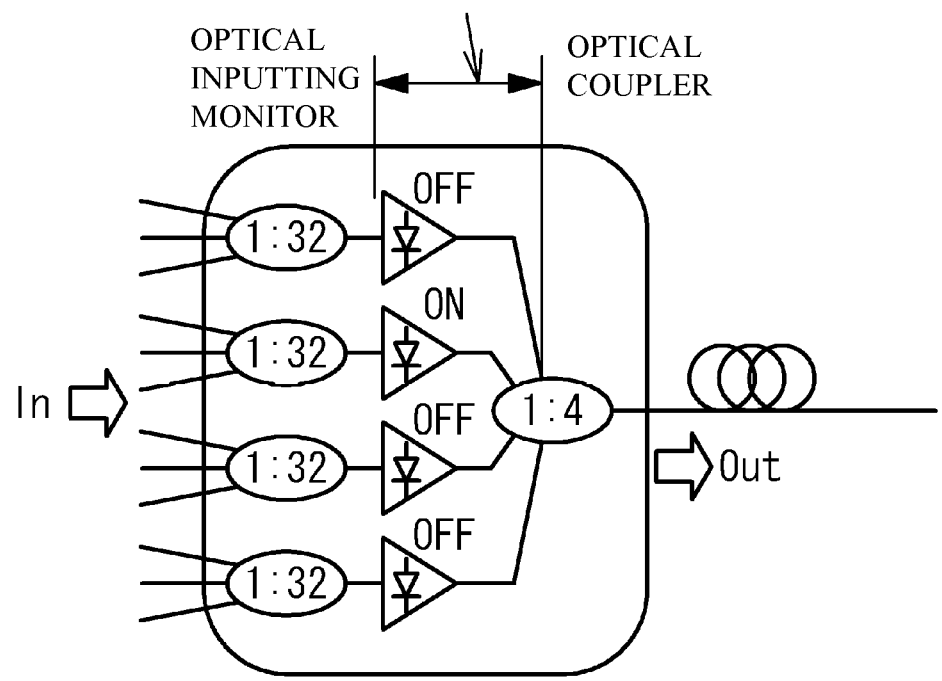
FIG. 6 illustrates a variability of an optical length from a light-receiving element to an optical coupler.

In the embodiment, a plurality of the SOAs 210 are provided. It is therefore preferable that a time from a detection time of a rising edge to a time when the rising edge reaches the optical coupler 204 is not variable among each port. For example, it is preferable that a deviation of the time from the detection time of the rising edge to the time when the rising edge reaches the optical coupler 204 is within 512 nsec among each port. For example, the deviation can be achieved by reducing a variability of the optical length of each port. As an example, with reference to FIG. 6, the deviation can be achieved when the variability of the optical length from the light-receiving element 22 acting as an optical inputting monitor to the optical coupler 204 is 102.4 m or less. It is preferable that a deviation of a response time of each level control device 20 is a few nano seconds or less.

Figure 7:
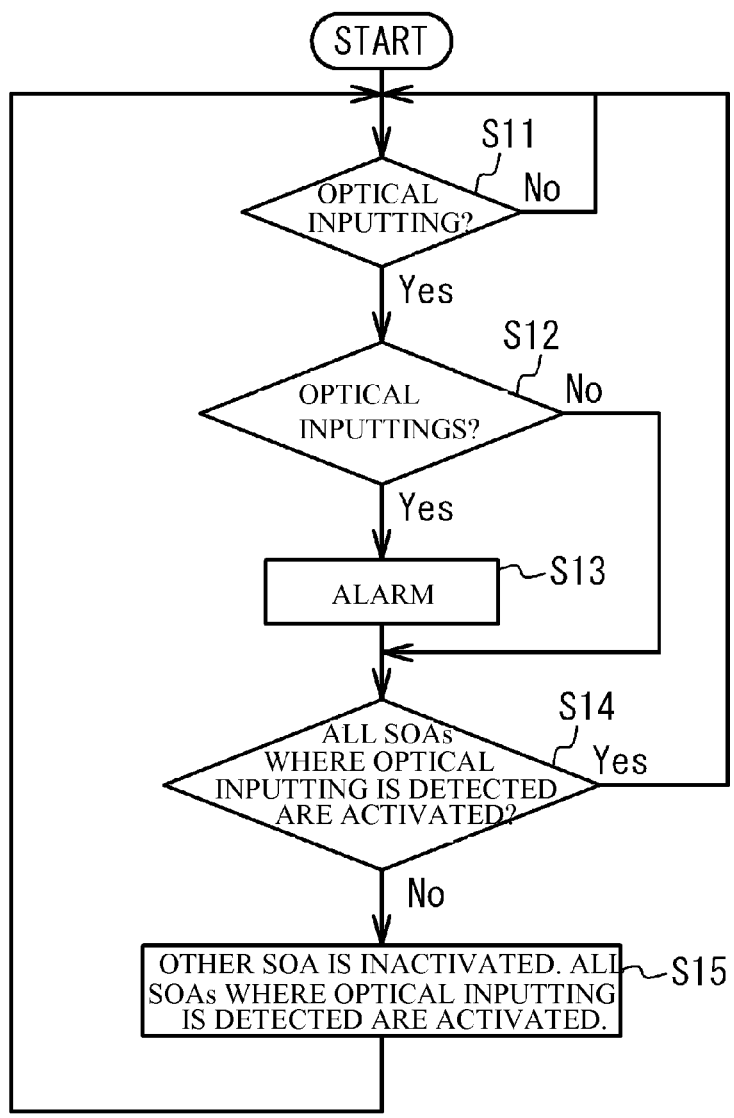
FIG. 7 illustrates a flowchart of an example of an operation in a case where optical inputting from a plurality of ONUs is detected in the optical amplification device.

There is a case where an optical transmitter of an ONU is out of order, and emits a light continuously. When a first ONU transmits an optical burst signal and a second ONU emits a light during the transmitting of the first ONU, the light from the second ONU is overlapped with the optical burst signal and the optical burst signal may be degraded. And so, it is preferable that an alarm is output when an optical inputting is detected by the light-receiving element 22 of a plurality of the level control devices 20 at a time. FIG. 7 illustrates a flowchart of an example of an operation of the optical amplification device 100 in a case where optical inputting from a plurality of ONUs is detected in the optical amplification device 100.

As illustrated in FIG. 7, the individual control unit 23 of each level control device 20 determines whether a light is input (Step S11). When it is determined as "No" in the Step S11, the Step S11 is executed again. In concrete, the individual control unit 23 determines whether a rising edge is detected. When it is determined as "Yes" in the Step S11, the overall control unit 10 determines whether optical inputting is detected in a plurality of the level control devices 20 (Step S12). In concrete, the overall control unit 10 determines whether an optical intensity detected by the light-receiving element 22 of two or more level control devices 20 is equal to a threshold or more.

When it is determined as "Yes" in the Step S12, the overall control unit 10 outputs a signal for informing an alarm to an outer component (Step S13). When it is determined as "No" in the Step S12 or after the execution of the Step S13, the overall control unit 10 determines whether all of the SOAs 210 of the level control devices 20 where the optical inputting is detected are activated (Step S14). When it is determined as "Yes" in the Step S14, the Step S11 is executed again. When it is determined as "No" in the Step S14, the overall control unit 10 activates all of the SOAs 210 of the level control devices 20 where the optical inputting is detected, and inactivates the SOA 210 of the other level control device 20 (Step S15). After that, the Step S11 is executed again.

When an optical inputting is detected in a plurality of the level control devices 20 at a time, an alarm may be output. In a registration process of a new ONU (Ranging Window), a collision of optical burst signals may occur. Therefore, during the registration process of the new ONU, only an alarm may be output, and the ONU may be determined as breakdown when an optical burst signal is input to a plurality of level control devices 20 at a time in a process other than the registration process of the new ONU.

Second Embodiment

Figure 8:
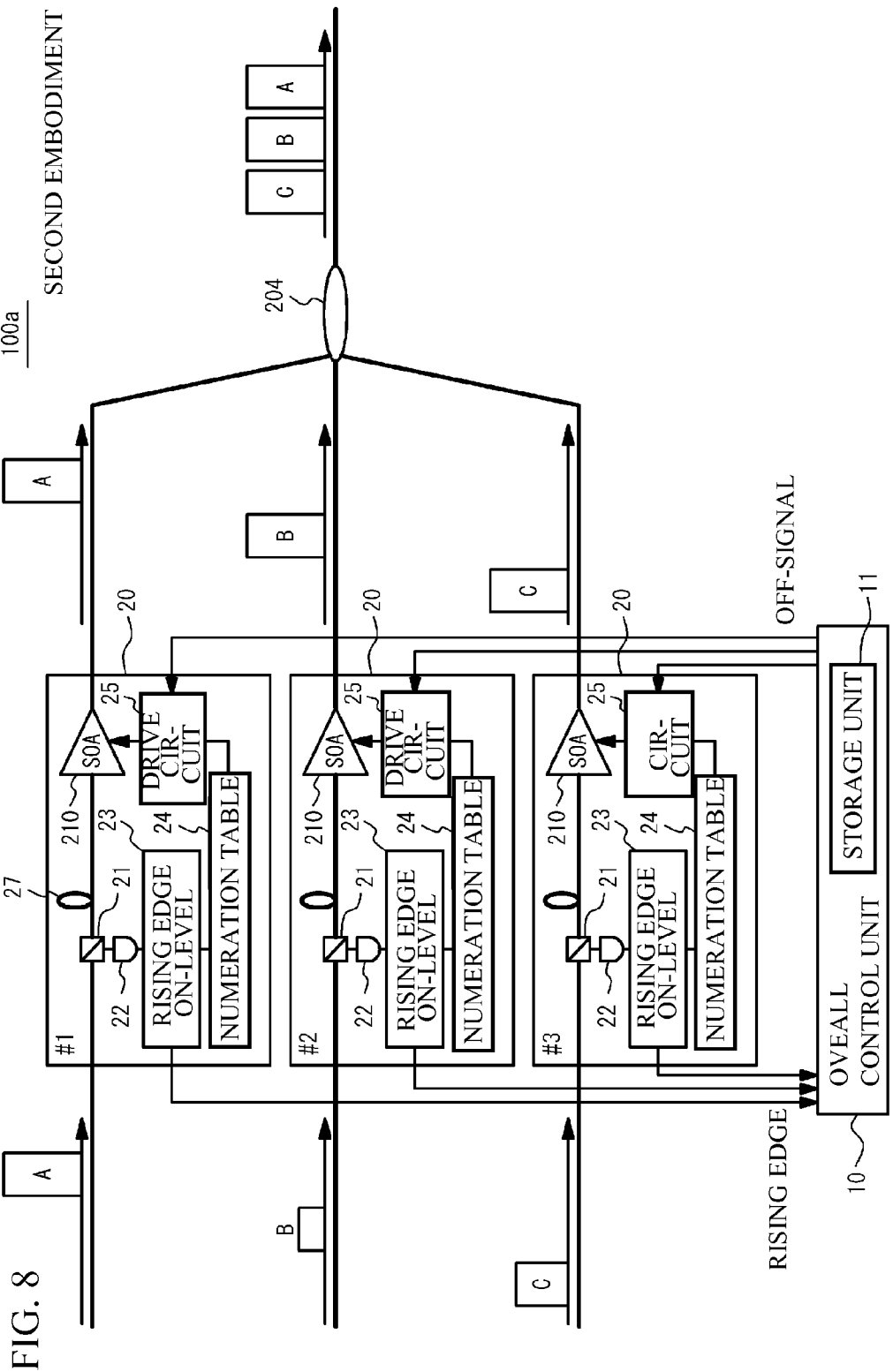
FIG. 8 illustrates a block diagram of an overall structure of an optical amplification device in accordance with a second embodiment.

FIG. 8 illustrates a block diagram of an overall structure of an optical amplification device 100a in accordance with a second embodiment. The optical amplification device 100a is different from the optical amplification device 100 of FIG. 4 in a point that the overall control unit 10 has a storage unit 11. In the embodiment, the storage unit 11 stores a port number as identification information for identifying the level control devices 20 in which an optical inputting is detected by the light-receiving element 22 at a time. When a combination of port numbers stored in the storage unit 11 is changed, the overall control unit 10 forcibly shuts down the SOA 210 of a common port number of both of the combinations. Thus, the optical inputting from the ONU that is likely to emit a light continuously can be controlled. Therefore, it is possible to continue a communication between the ONU and the OLT.

Figure 9:
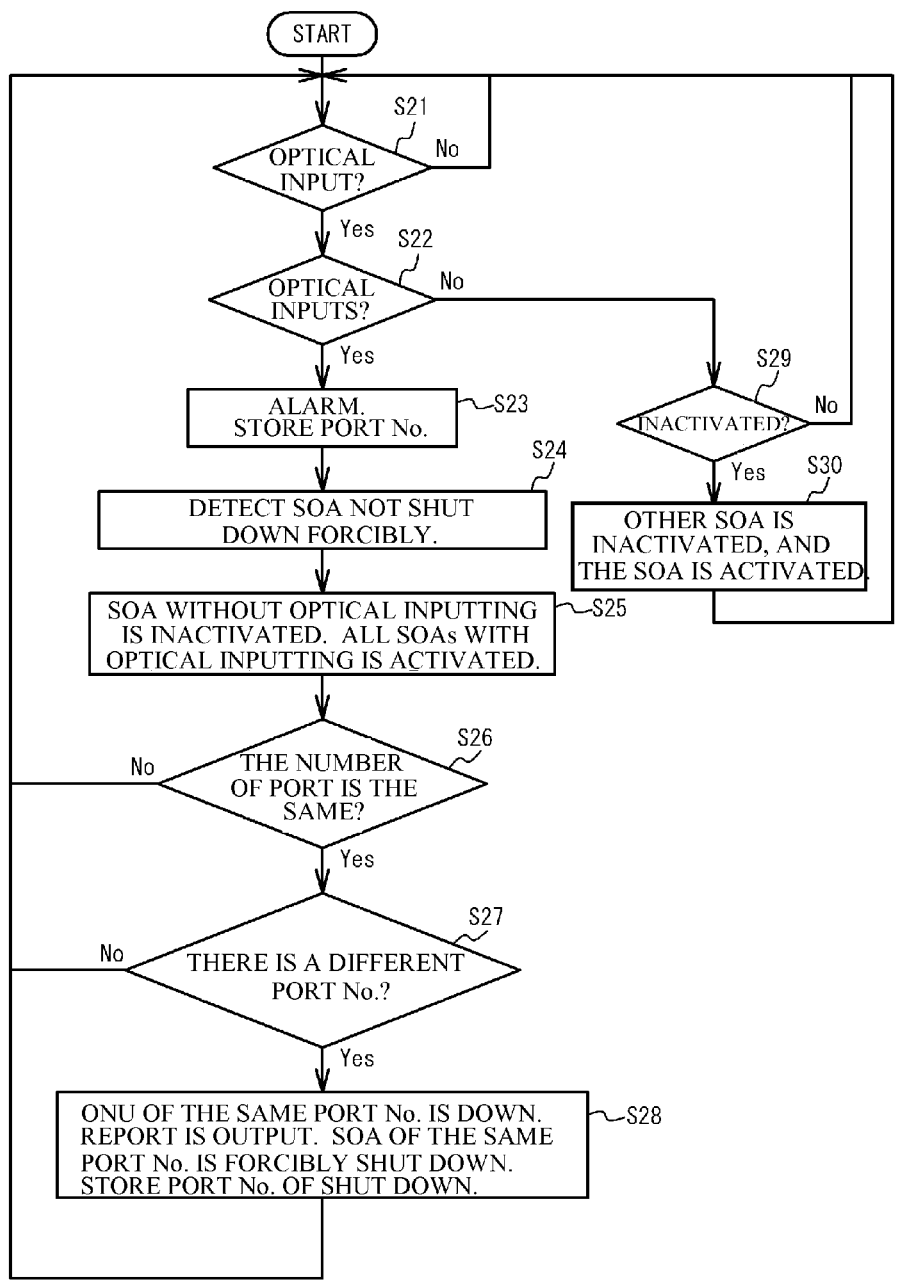
FIG. 9 illustrates a flowchart of an example of an operation in a case where optical inputting from a plurality of ONUs is detected in the optical amplification device.

FIG. 9 illustrates a flowchart of an example of an operation of the optical amplification device 100a in a case where an optical inputting from a plurality of ONUs is detected in the optical amplification device 100a. As illustrated in FIG. 9, the individual control unit 23 of each level control device 20 determines whether a light is input (Step S21). In concrete, the individual control unit 23 determines whether a rising edge is detected. When it is determined as "No" in the Step S21, the Step S21 is executed again. When it is determined as "Yes" in the Step S21, the overall control unit 10 determines whether an optical inputting is detected in a plurality of the level control devices 20 (Step S22).

When it is determined as "Yes" in the Step S22, the overall control device 10 outputs a signal for informing an alarm to an outer component, and makes the storage unit 11 store a port number of the level control device 20 in which the optical inputting is detected (Step S23). Next, the overall control unit 10 detects the SOA 210 that is not shut-down in the level control devices 20 in which an optical inputting is detected (Step S24). Next, the overall control unit 10 considers the SOA 210 that is forcibly shut-down as ineligible, inactivates the SOA 210 of the level control device 20 in which the optical inputting is not detected, and activates all of the SOAs 210 of the level control devices 20 in which the optical inputting is detected (Step S25).

Next, the overall control unit 10 determines whether the number of the ports in which the optical inputting is detected is the same as the last number of ports (Step S26). When it is determined as "No" in the Step S26, the step S21 is executed again. When it is determined as "Yes" in the Step S26, the overall control unit 10 checks the last input port number and an input port number of this time, and determines whether there is a different input port number (Step S27). When it is determined as "No" in the Step S27, the Step S21 is executed again. When it is determined as "Yes" in the Step S27, the overall control unit 10 determines that the ONU that inputs a light to the level control device 20 of a common port number between the last time and this time is out of order, outputs information of the determination to the outer component, and forcibly shuts-down the SOA 210 of the level control device 20. And, the overall control unit 10 stores a port number that is forcibly shut-down (Step S28). After that, the Step S21 is executed again.

When it is determined as "No" in the Step S22, the individual control unit 23 determines whether the SOA 210 of the level control device 20 in which a rising edge is detected is inactivated (Step S29). In concrete, the individual control unit 23 determines whether the drive circuit 25 of the level control device 20 thereof controls the drive voltage to be zero. When it is determined as "No" in the Step S29, the Step S21 is executed again. When it is determined as "Yes" in the Step S29, the individual control unit 23 gives an on-level to the numeration table unit 24, and transmits a rising-edge detection signal to the overall control unit 10. Thus, the SOA 210 is activated. On the other hand, the overall control unit 10 transmits an off-signal for instructing an off to the drive circuit 25 of the level control device 20 other than the level control device 20 that transmits a rising-edge detection signal. The drive circuit 25 that receives the off-signal controls the drive voltage of the SOA 210 to be zero. Thus, the SOA 210 of the level control device 20 other than the level control device 20 in which the rising edge is detected is inactivated (Step S30). After that, the Step S21 is executed again.

Figure 10:
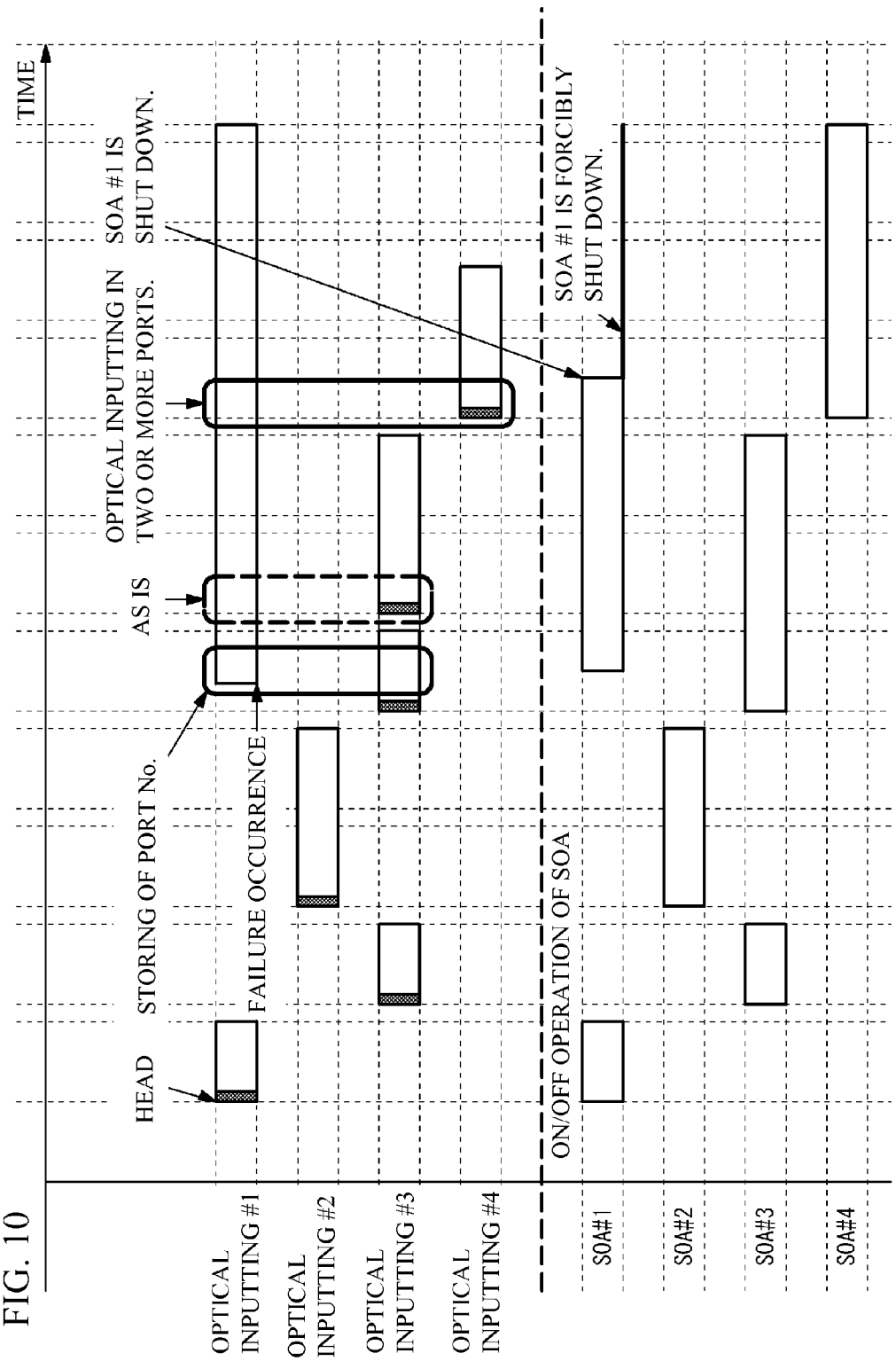
FIG. 10 illustrates an example of a time chart for describing a method in accordance with the flowchart of FIG. 9.

FIG. 10 illustrates an example of a time chart for describing a process in accordance with the flowchart of FIG. 9. As illustrated in FIG. 10, when an optical inputting is detected in any of the level control devices 20, the SOA 210 of the level control device 20 in which the optical inputting is detected is activated, and the SOA 210 of the level control device 20 other than the level control device 20 in which the optical inputting is detected is inactivated. In the example of FIG. 10, an optical burst signal is input into the level control devices 20 of #1, #3, #2 and #3 in order.

When the ONU connected to the level control device 20 of #1 emits a light because of a breakdown during inputting of an optical burst signal to the level control device 20 of #3, an optical inputting is detected in the level control devices 20 of #1 and #3 at a time. In this case, the overall control unit 10 makes the storage unit 11 store the port numbers of #1 and #3. Although the optical burst signal input into the level control device 20 of #3 is broken down during remaining of the emitting by the ONU, the overall control unit 10 does not use the breakdown of the optical inputting as a process or a control.

When an optical burst signal is input into the level control device 20 of #3 again, the overall control unit 10 detects that an optical inputting is detected in the level control devices 20 of #1 and #3. In this case, the overall control unit 10 checks a port number in which an optical inputting is detected at a present time and a stored port number. When the port number is the same as a result of the checking, the overall control unit 10 remains the stored port number.

When the inputting of an optical burst signal to the level control device 20 of #3 is broken down and an optical burst signal is input into the level control device 20 of #4, the overall control unit 10 detects that an optical inputting is detected in the level control devices 20 of #1 and #4. In this case, the overall control unit 10 checks the port number in which an optical inputting is detected at a present time and a stored port number. As a result of the checking, one port number (#1) corresponds to each other and the other port number does not correspond to each other. Therefore, the overall control unit 10 determines that the ONU inputting a light to the level control device 20 of #1 is out of order. In this case, the overall control unit 10 forcibly shuts down the SOA 210 of the level control device 20 of #1.

In accordance with the embodiment, when an optical inputting is detected in a plurality of the level control devices 20 at a time, the ONUs emitting a light at a time can be specified. In a registration process of a new ONU (Ranging Window), a collision of optical burst signals may occur. Therefore, the embodiment may be applied to other than the registration process of the new ONU.

Third Embodiment

Figure 11:
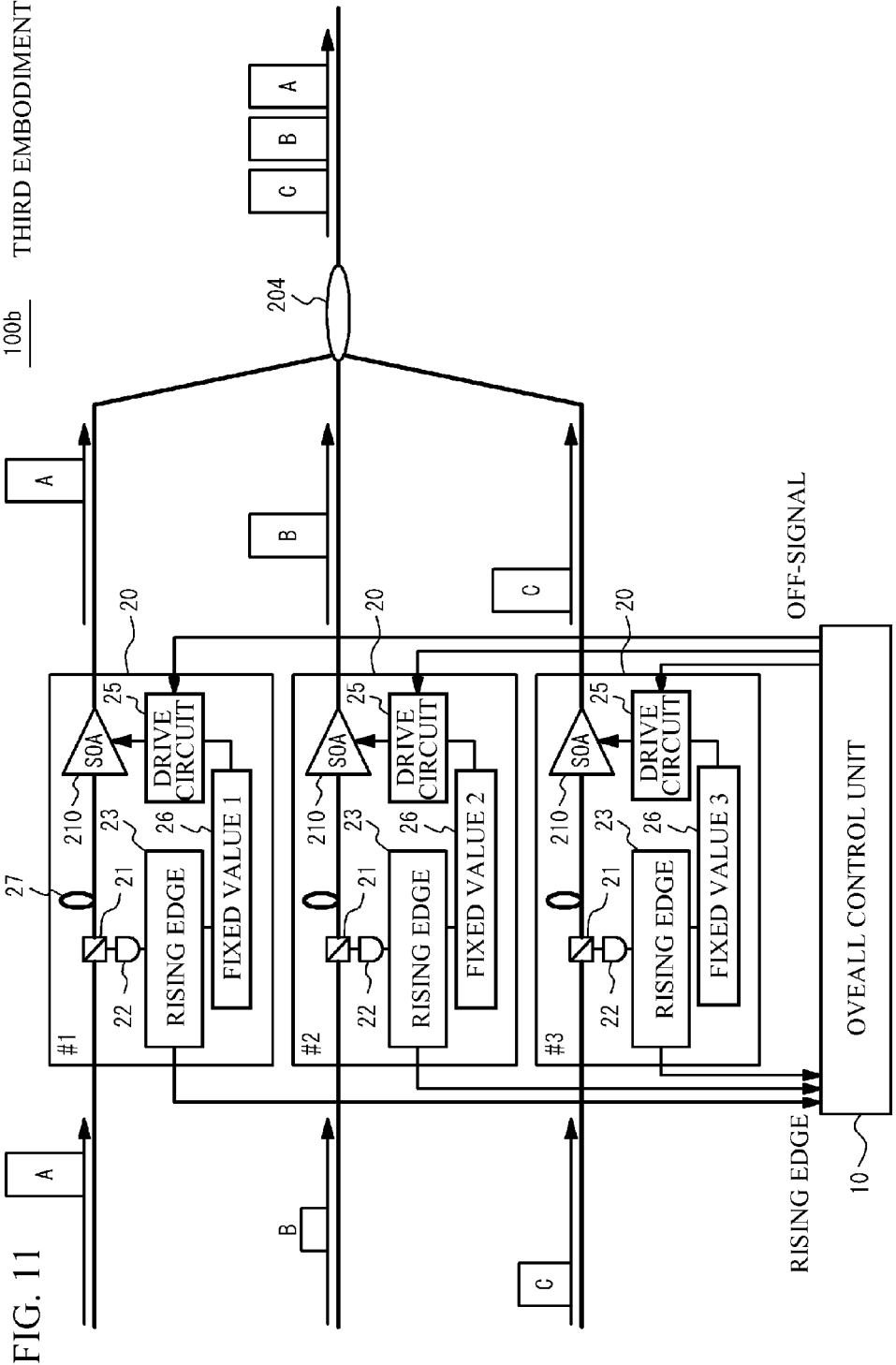
FIG. 11 illustrates a block diagram of an overall structure of an optical amplification device in accordance with a third embodiment.

FIG. 11 illustrates a block diagram of an overall structure of an optical amplification device 100*b* in accordance with a third embodiment. The optical amplification device 100*b* is different from the optical amplification device 100 of FIG. 4 in a point that a fixed-value remain unit 26 is provided instead of the numeration table unit 24 in each level control device 20. The fixed-value remain unit 26 is different from the numeration table unit 24, and remains a fixed drive voltage. The fixed drive voltage value is set in accordance with an optical loss amount occurring in a path from the SOA 210 of each port number to the ONU. In concrete, the larger the optical loss amount occurring in the path from the SOA 210 to the ONU is, the larger the drive voltage value is remained. The smaller the optical loss amount occurring in the path from the SOA 210 to the ONU is, the smaller the drive voltage value is remained.

In the embodiment, the individual control unit 23 does not reads an optical intensity after a rising edge (on-level) when detecting a rising edge of an optical burst signal. The fixed-value remain unit 26 gives a remained drive voltage value to the drive circuit 25 when detecting the rising edge. The drive circuit 25 applies a drive voltage of a received drive voltage value to the SOA 210. Thus, the SOA 210 is activated, and an optical level of an optical burst signal input into the SOA 210 is controlled to be a desirable value.

In accordance with the embodiment, a process may be simplified. And, a data amount of the numeration table or the like may be reduced. The embodiment can be applied to the first embodiment and the second embodiment. In concrete, the fixed-value remain unit 26 may be provided instead of the numeration table unit 24.

Although a rising edge is detected when detecting an optical inputting in the above-mentioned embodiments, the structure is not limited. For example, an optical inputting may be detected in accordance with an input optical intensity.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical amplification device comprising:
    a plurality of semiconductor optical amplifiers to which an optical burst signal is input at a different timing;
    an optical coupler that combines output signals output from the plurality of semiconductor optical amplifiers;
    a detection unit that detects an optical inputting to the plurality of semiconductor optical amplifiers; and
    a control unit that activates one of the semiconductor optical amplifiers where the optical inputting is detected, inactivates the other semiconductor optical amplifier, and remains the activation until another optical inputting is detected in the other semiconductor optical amplifier.

2. The optical amplification device as claimed in claim 1, wherein the control unit outputs a signal for informing an alarm when the optical inputting is detected in two or more semiconductor optical amplifiers at a time.

3. The optical amplification device as claimed in claim 1 further comprising a storage unit that stores identification information of two or more semiconductor optical amplifiers where the optical inputting is detected at a time,
    wherein when a combination of the semiconductor optical amplifiers stored in the storage unit is changed, the control unit inactivates a common semiconductor optical amplifier stored in the storage unit in the combinations.

4. The optical amplification device as claimed in claim 1, wherein among the plurality of semiconductor optical amplification devices, a deviation among times from a starting time of the detection of the optical inputting by the detection unit to a time when a light regarding the optical inputting reaches the optical coupler is within 512 nsec.

5. An optical amplification method of an optical amplification device combining output signals output by a plurality of semiconductor optical amplifiers to which an optical burst signal is input at a different timing, the method comprising:
   activating one of semiconductor optical amplifiers where an optical inputting is detected;
   inactivating the other semiconductor optical amplifier; and
   remaining the activation until another optical inputting is detected in the other semiconductor optical amplifier.

* * * * *